United States Patent
Ikawa

(10) Patent No.: US 11,036,449 B2
(45) Date of Patent: Jun. 15, 2021

(54) IMAGE FORMING APPARATUS WITH MULTIPLE MEMORIES SO THAT INFORMATION CAN BE TRANSFERRED TO ONE OF THE MEMORIES WHEN SPACE IS AVAILABLE

(71) Applicant: KYOCERA Document Solutions Inc., Osaka (JP)

(72) Inventor: Koji Ikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/608,731

(22) PCT Filed: Apr. 23, 2018

(86) PCT No.: PCT/JP2018/016471
§ 371 (c)(1),
(2) Date: Oct. 25, 2019

(87) PCT Pub. No.: WO2018/199030
PCT Pub. Date: Nov. 1, 2018

(65) Prior Publication Data
US 2020/0341709 A1  Oct. 29, 2020

(30) Foreign Application Priority Data

Apr. 28, 2017 (JP) .............................. JP2017-089258

(51) Int. Cl.
*G06F 3/12* (2006.01)
*H04N 1/333* (2006.01)
*G03G 15/00* (2006.01)

(52) U.S. Cl.
CPC ............ *G06F 3/1262* (2013.01); *G06F 3/122* (2013.01); *G06F 3/1267* (2013.01); *G03G 15/50* (2013.01);

(Continued)

(58) Field of Classification Search
None
See application file for complete search history.

(56) References Cited

U.S. PATENT DOCUMENTS 7,042,582 B1* 5/2006 Shima .................... G06K 15/00
358/1.13
7,057,759 B2* 6/2006 Lapstun ..................... B41J 2/00
358/1.13

(Continued)

FOREIGN PATENT DOCUMENTS

JP    2006-212888 A    8/2006

OTHER PUBLICATIONS

NPL searched Printer transfer print data from first memory to second memory.*

*Primary Examiner* — Haris Sabah
(74) *Attorney, Agent, or Firm* — Studebaker & Brackett PC

(57) ABSTRACT

An image forming apparatus (100) includes a guaranteed area (RA), a receiving section (501), a second determination section (504), and an execution section (505). The receiving section (501) receives jobs (JB). When the receiving section (501) receives a first job (JB1), the second determination section (504) determines whether or not a first user (U1) who has input the first job (JB1) matches a second user (U2) who has input a second job (JB2) that is under execution using the guaranteed area (RA). When the second determination section (504) determines that the first user (U1) matches the second user (U2), the execution section (505) loads an image included in the first job (JB1) into the guaranteed area (RA), and executes the first job (JB1) subsequent to the second job (JB2).

7 Claims, 11 Drawing Sheets

(52) U.S. Cl.
CPC ........ *G06F 3/1238* (2013.01); *H04N 1/33376* (2013.01)

(56) References Cited

U.S. PATENT DOCUMENTS

| | | | | |
|---|---|---|---|---|
| 2004/0212832 A1* | 10/2004 | Shibata | .............. | H04N 1/32379 358/1.16 |
| 2006/0212590 A1* | 9/2006 | Parks | .................... | H04N 1/444 709/229 |
| 2010/0002263 A1* | 1/2010 | Shindoh | ............. | H04N 1/32443 358/1.16 |
| 2012/0140287 A1* | 6/2012 | Kawaguchi | ........ | G06K 15/1817 358/1.16 |
| 2014/0078531 A1* | 3/2014 | Park | ................... | H04N 1/00954 358/1.13 |
| 2015/0220825 A1* | 8/2015 | Oikawa | ............. | H04N 1/32448 358/1.13 |

* cited by examiner

IMAGE FORMING APPARATUS WITH MULTIPLE MEMORIES SO THAT INFORMATION CAN BE TRANSFERRED TO ONE OF THE MEMORIES WHEN SPACE IS AVAILABLE

TECHNICAL FIELD

The present invention relates to an image processing device and an image forming apparatus.

BACKGROUND ART

An image forming apparatus disclosed in Patent Literature 1 includes a job registration section, a user recognition section, and a rearrangement section. The job registration section registers print jobs input by a plurality of users in order of input. The user recognition section recognizes the users who have input the print jobs. The rearrangement section rearranges execution order of the print jobs that are to be executed by a printing section and that are registered in the job registration section based on a result of recognition by the user recognition section such that print jobs of the same user are executed successively.

CITATION LIST

Patent Literature

[Patent Literature 1]
Japanese Patent Application Laid-Open Publication No. 2006-212888

SUMMARY OF INVENTION

Technical Problem

However, the image forming apparatus disclosed in Patent Literature 1 rearranges the execution order of the registered print jobs, which necessitates provision of a large-capacity storage device.

The present invention has been made in view of the foregoing and has its object of providing an image processing device and an image forming apparatus that are capable of successively executing jobs of the same user without need of a large-capacity storage device.

Solution to Problem

An image processing device according to the present invention includes storage, a receiving section, a first determination section, a securing section, an execution section, and a second determination section. The receiving section receives jobs. When the receiving section receives a job among the jobs, the first determination section determines whether or not there is a specific amount of free space in the storage necessary for execution of the job received by the receiving section. The securing section secures the specific amount of a guaranteed area in the storage according to a result of determination by the first determination section. The execution section loads into the guaranteed area an image included in the job received by the receiving section, and executes the job received by the receiving section. When the receiving section receives a first job among the jobs, the second determination section determines whether or not a first user who has input the first job matches a second user who has input a second job among the jobs that is under execution using the guaranteed area. When the second determination section determines that the first user matches the second user, the execution section loads an image included in the first job into the guaranteed area into which an image included in the second job has been loaded, and executes the first job subsequent to the second job.

An image forming apparatus according to the present invention includes the image processing device and an image forming section. The image forming section forms an image on a recording medium. The jobs are each a job to form an image on the recording medium using the image forming section.

Advantageous Effects of Invention

According to the image processing device and the image forming apparatus of the present invention, jobs of the same user can be successively executed without need of a large-capacity storage device.

DESCRIPTION OF EMBODIMENTS

Figure 1:
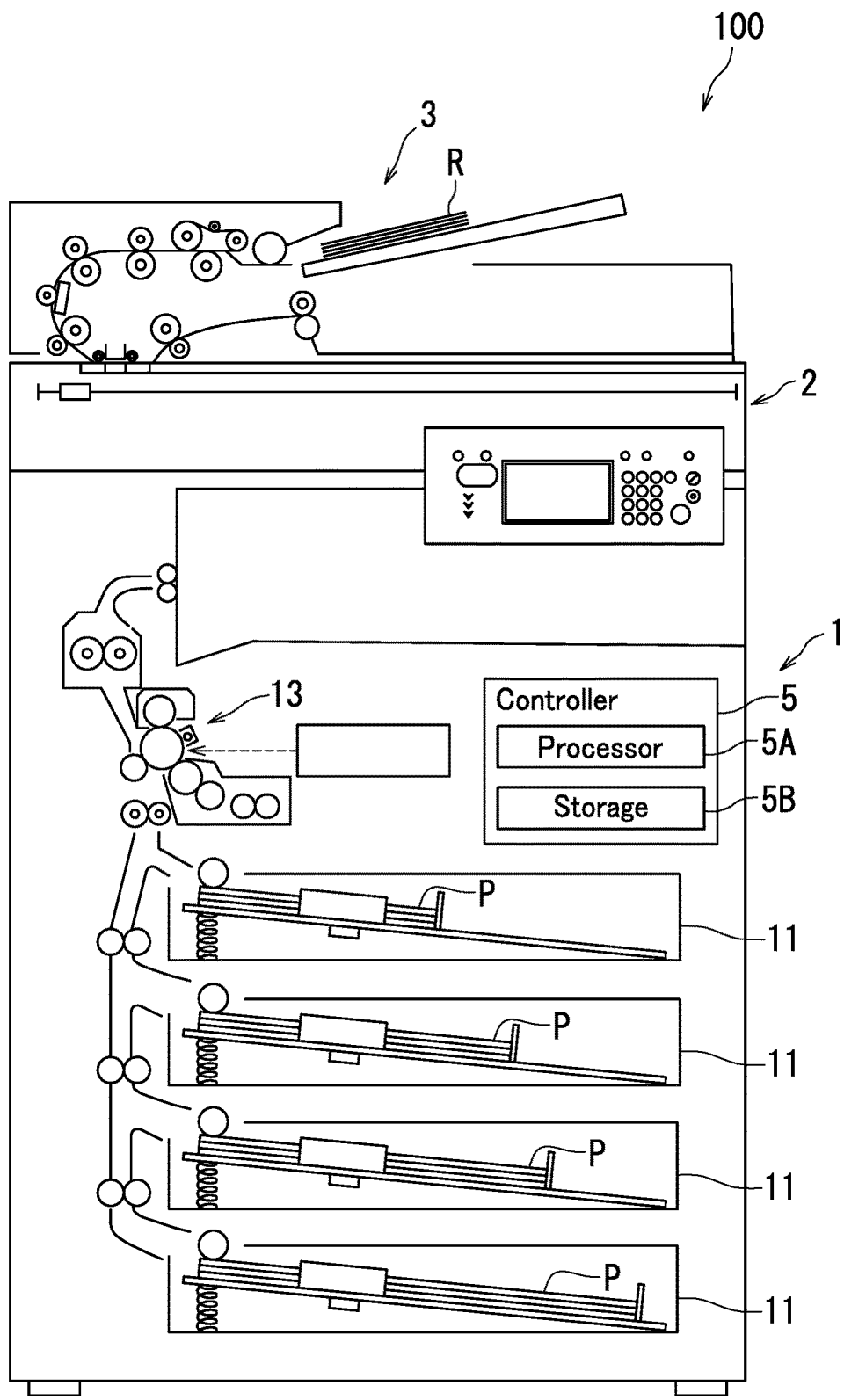
FIG. 1 is a diagram illustrating a configuration of an image forming apparatus according to an embodiment of the present invention.

The following describes an embodiment of the present disclosure with reference to accompanying drawings (FIGS. 1 to 11). Elements that are the same or equivalent are indicated by the same reference signs in the drawings, and description thereof is not repeated.

An image forming apparatus 100 according to the embodiment of the present invention will be described first with reference to FIG. 1. FIG. 1 is a diagram illustrating a configuration of the image forming apparatus 100. As illustrated in FIG. 1, the image forming apparatus 100 is a multifunction peripheral. The image forming apparatus 100 includes an image forming unit 1, an image reading unit 2, a document conveyance unit 3, and a controller 5.

The image forming unit 1 forms an image on paper P that is an example of a recording medium. The image reading unit 2 reads an image of a document R. The document conveyance unit 3 feeds the document R to the image reading unit 2. The controller 5 controls operation of the image forming apparatus 100. Note that the controller 5 corresponds to an "image processing device".

The image forming unit 1 includes a feed cassette 11 and an image forming section 13. The paper P fed from the feed cassette 11 is conveyed to the image forming section 13. The image forming section 13 forms an image on the paper P. After the image formed on the paper P is fixed to the paper P, the paper P with the image formed thereon is ejected.

The controller 5 includes a processor 5A and storage 5B. The processor 5A includes for example a central processing unit (CPU). The storage 5B includes memory such as semiconductor memory and does not include a hard disk drive (HDD). The storage 5B stores control programs therein. The processor 5A functions as various functional sections through execution of the control programs.

Figure 2:
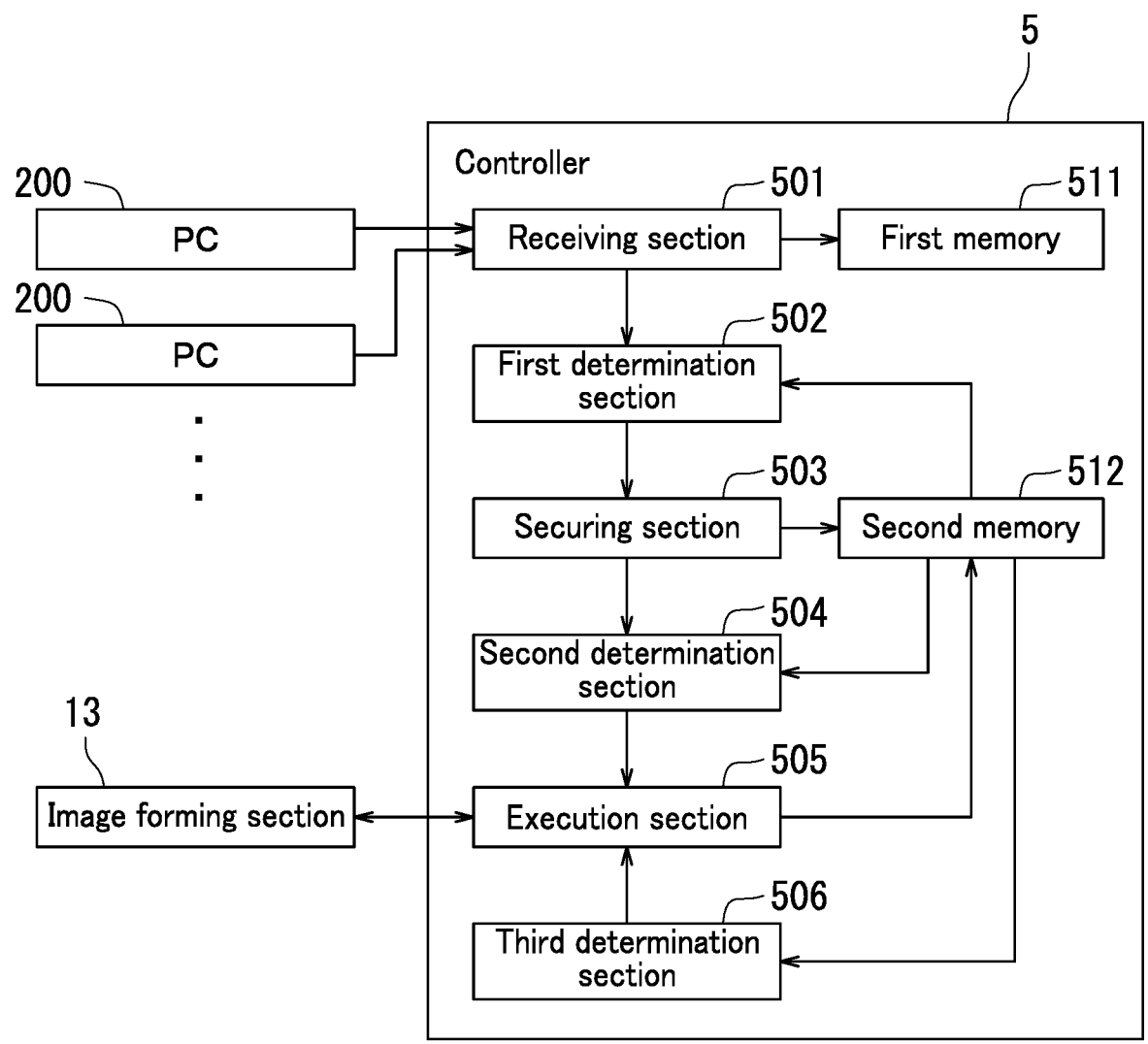
FIG. 2 is a diagram illustrating a configuration of a controller according to the embodiment of the present invention.

The following describes a configuration of the controller 5 according to the embodiment of the present invention with reference to FIGS. 1 and 2. FIG. 2 is a diagram illustrating the configuration of the controller 5. As illustrated in FIG. 2, the controller 5 includes a receiving section 501, a first determination section 502, a securing section 503, a second determination section 504, an execution section 505, and a third determination section 506. Specifically, the processor 5A executes the control programs to function as the receiving section 501, the first determination section 502, the securing section 503, the second determination section 504, the execution section 505, and the third determination section 506. The controller 5 further includes first memory 511 and second memory 512. The first memory 511 and the second memory 512 are included in the storage 5B.

The receiving section 501 receives jobs JB from personal computers 200. The personal computers 200 are connected to the controller 5 via a network in a communicable manner. The network is for example a local area network (LAN), a wide area network (WAN), or the Internet. In the present embodiment, the jobs JB each are a job (print job) to form an image on paper P using the image forming section 13.

The first memory 511 stores the jobs JB received by the receiving section 501.

When the receiving section 501 receives a job JB, the first determination section 502 determines whether or not the second memory 512 has a specific amount of free space necessary for execution of the job JB received by the receiving section 501.

The second memory 512 has a guaranteed area. An image included in the job JB is loaded into the guaranteed area for execution of the job JB.

The securing section 503 secures the specific amount of the guaranteed area in the second memory 512 according to a result of determination by the first determination section 502.

Once the receiving section 501 receives a first job JB1, the second determination section 504 determines whether or not a first user U1 who has input the first job JB1 matches a second user U2 who has input a second job JB2 that is under execution using the guaranteed area.

The execution section 505 loads into the guaranteed area an image included in a job JB received by the receiving section 501, and executes the job JB. When the second determination section 504 determines that the first user U1 matches the second user U2, the execution section 505 loads an image included in the first job JB1 into the guaranteed area into which an image included in the second job JB2 has been loaded, and executes the first job JB1 subsequent to the second job JB2.

The third determination section 506 determines whether or not free space of the guaranteed area of the second job JB2 has reached an amount equal to or greater than an amount of an area necessary for loading of a one-page image included in the first job JB1.

According to the present embodiment as described with reference to FIGS. 1 and 2, when the second user U2 who has input the second job JB2 under execution is the same user as the first user U1 who has input the first job JB1 received by the receiving section 501, the execution section 505 executes the first job JB1 subsequent to the second job JB2. Thus, it is unnecessary to rearrange execution order of the registered jobs JB. Consequently, jobs of the same user (i.e., the second job JB2 and the first job JB1 of the second user) can be successively executed without need of a large-capacity storage device.

The jobs JB each are a job to form an image on paper P (print job). Accordingly, print jobs input by the same user can be executed successively. Therefore, user convenience can be improved.

Figure 3:
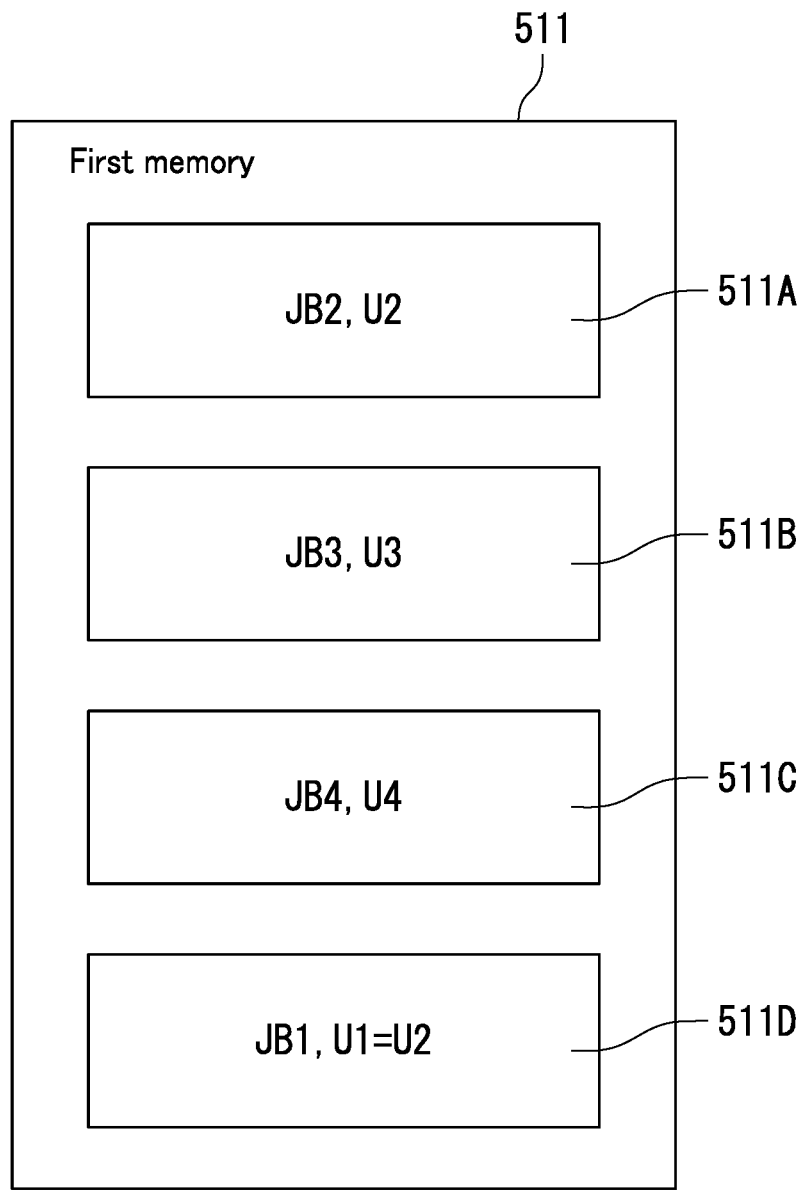
FIG. 3 is a diagram illustrating an example of first memory in which jobs are stored.

The following describes the first memory 511 with reference to FIGS. 1 to 3. FIG. 3 is a diagram illustrating an example of the first memory 511 in which jobs JB are stored. As illustrated in FIG. 3, the first memory 511 stores therein a second job JB2, a third job JB3, a fourth job JB4, and a first job JB1. The receiving section 501 receives the second job JB2, the third job JB3, the fourth job JB4, and the first job JB1 in the stated order and stores them in the first memory 511.

The first memory 511 has an area 511A, an area 511B, an area 511C, and an area 511D. The second job JB2 is stored in the area 511A. The second job JB2 is a job JB input from a personal computer 200 of the second user U2. The third job JB3 is stored in the area 511B. The third job JB3 is a job JB input from a personal computer 200 of a third user U3. The fourth job JB4 is stored in the area 511C. The fourth job JB4 is a job JB input from a personal computer 200 of a fourth user U4. The first job JB1 is stored in the area 511D. The first job JB1 is a job JB input from a personal computer 200 of the first user U1. Note that the first user U1 and the second user U2 are the same as each other in the present embodiment. The first memory 511 has a capacity for storing 4 jobs JB in the present embodiment.

As described with reference to FIGS. 1 to 3, in the present embodiment, the four jobs JB are stored in the first memory 511 in order of receipt by the receiving section 501. As a result of the four jobs JB being stored in the first memory 511, the four jobs JB are each registered as a job JB waiting for execution.

Figure 4:
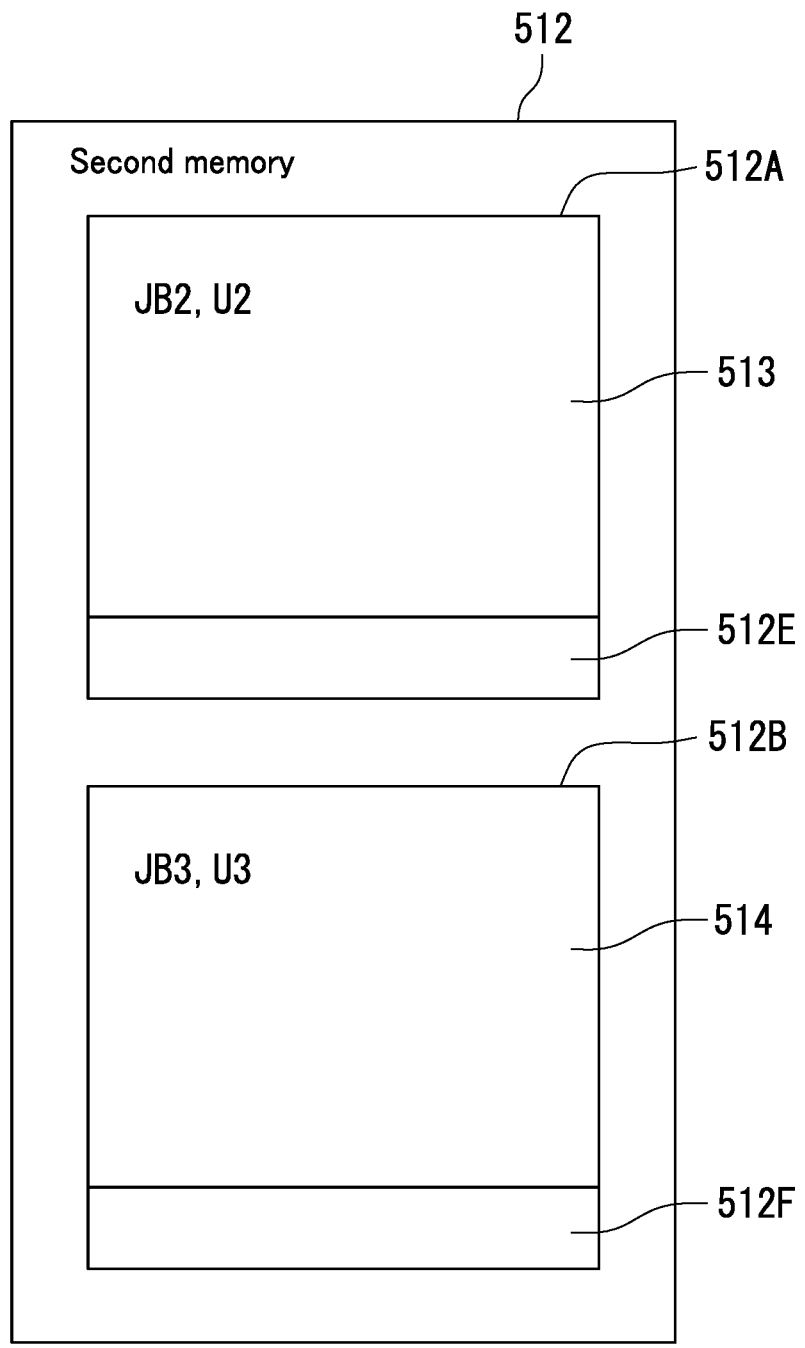
FIG. 4 is a diagram illustrating an example of second memory in which jobs are stored.

The following describes the second memory 512 with reference to FIGS. 1 to 5. FIG. 4 is a diagram illustrating an example of the second memory 512 in which jobs JB are stored. The second memory 512 has two guaranteed areas as illustrated in FIG. 4. Specifically, the second memory 512 has a first guaranteed area 512A and a second guaranteed area 512B. The first guaranteed area 512A includes an area 513 and a free space 512E. The second guaranteed area 512B includes an area 514 and a free space 512F.

At a time when the receiving section 501 receives the second job JB2, no job JB is stored in the second memory 512. The first determination section 502 accordingly determines that there is the specific amount of free space in the second memory 512. The specific amount corresponds to an amount of the first guaranteed area 512A and the second guaranteed area 512B. The securing section 503 secures the first guaranteed area 512A. The execution section 505 then loads an image included in the second job JB2 into the area 513. Furthermore, the execution section 505 deletes the second job JB2 from the area 511A of the first memory 511.

At a time when the receiving section 501 receives the third job JB3, the image included in the second job JB2 has been loaded into the first guaranteed area 512A and no job JB is stored in the second guaranteed area 512B of the second memory 512. The first determination section 502 accordingly determines that there is the specific amount of free space in the second memory 512. The securing section 503 secures the second guaranteed area 512B. The execution section 505 then loads an image included in the third job JB3 into the area 514. Furthermore, the execution section 505 deletes the third job JB3 from the area 511B of the first memory 511.

At a time when the receiving section 501 receives the fourth job JB4, the image included in the second job JB2 has been loaded into the first guaranteed area 512A and the image included in the third job JB3 has been loaded into the second guaranteed area 512B of the second memory 51. The first determination section 502 accordingly determines that there is not the specific amount of free space in the second memory 512. As such, the securing section 503 secures neither the first guaranteed area 512A nor the second guaranteed area 512B.

Figure 5:
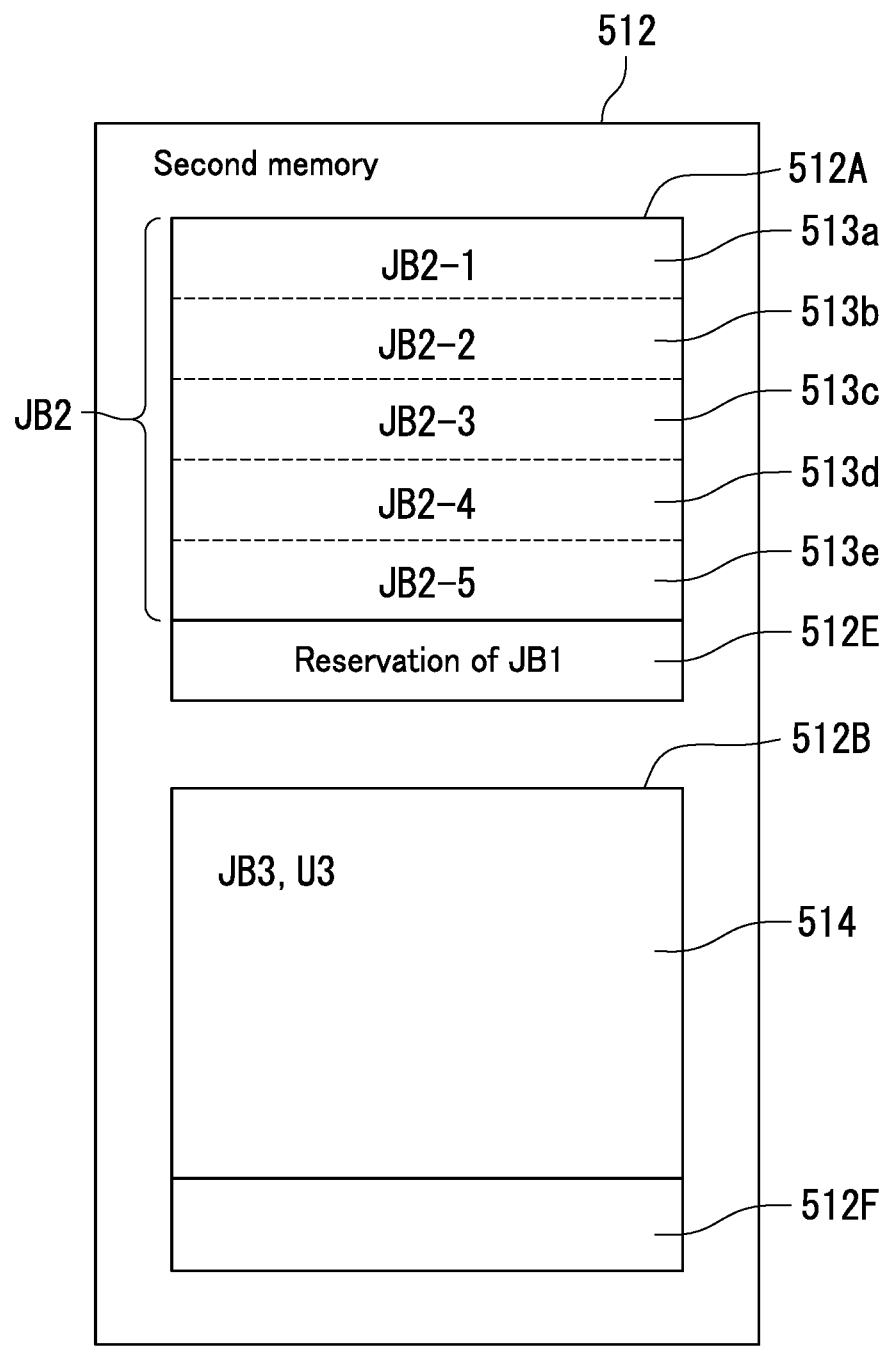
FIG. 5 is a diagram illustrating an example of the second memory in which a job is loaded.

The following further describes the second memory 512 with reference to FIG. 5. As illustrated in FIG. 5, the execution section 505 loads images included in the second job JB2 into the first guaranteed area 512A of the second memory 512. The area 513 of the first guaranteed area 512A includes a first area 513a, a second area 513b, a third area 513c, a fourth area 513d, and a fifth area 513e. The second job JB2 includes five page images in the present embodiment. The second job JB2 includes a first page image JB2-1, a second page image JB2-2, a third page image JB2-3, a fourth page image JB2-4, and a fifth page image JB2-5.

The execution section 505 accordingly loads the first page image JB2-1 into the first area 513a. The execution section 505 further loads the second page image JB2-2 into the second area 513b. The execution section 505 loads the third page image JB2-3 into the third area 513c. The execution section 505 loads the fourth page image JB2-4 into the fourth area 513d. The execution section 505 loads the fifth page image JB2-5 into the fifth area 513e.

When the receiving section 501 receives the first job JB1, the second determination section 504 determines whether or not the first user U1 who has input the first job JB1 matches the second user U2 who has input the second job JB2 that is under execution using the first guaranteed area 512A. The second user U2 who has input the second job JB2 is the same as the first user U1. In the above situation, the second determination section 504 determines that the first user U1 and the second user U2 match each other and the execution section 505 accordingly reserves the first guaranteed area 512A as an area for execution of the first job JB1. The phrase "reserves the first guaranteed area 512A" means that the execution section 505 loads an image included in the first job JB1 into the first guaranteed area 512A along with execution of the second job JB2, and executes the first job JB1 subsequent to the second job JB2.

In the present embodiment, the second determination section 504 determines, upon receipt of the first job JB1, whether or not the first user who has input the first job JB1 matches the second user U2 who has input the second job JB2 that is under execution using the first guaranteed area 512A. However, the present invention is not limited to this. The second determination section 504 may further determine, upon receipt of the first job JB1, whether or not the first user U1 who has input the first job JB1 matches the third user U3 who has input the third job JB3 that has been loaded into the second guaranteed area 512B.

When the third user U3 who has input the third job JB3 matches the first user U1 who has input the first job JB1, the execution section 505 executes the first job JB1 subsequent to the third job JB3. Thus, it is unnecessary to rearrange the execution order of the registered jobs JB. Therefore, jobs of the same user (the third job JB3 and the first job JB1 of the third user U3) can be executed successively without need of a large-capacity storage device.

Figure 6:
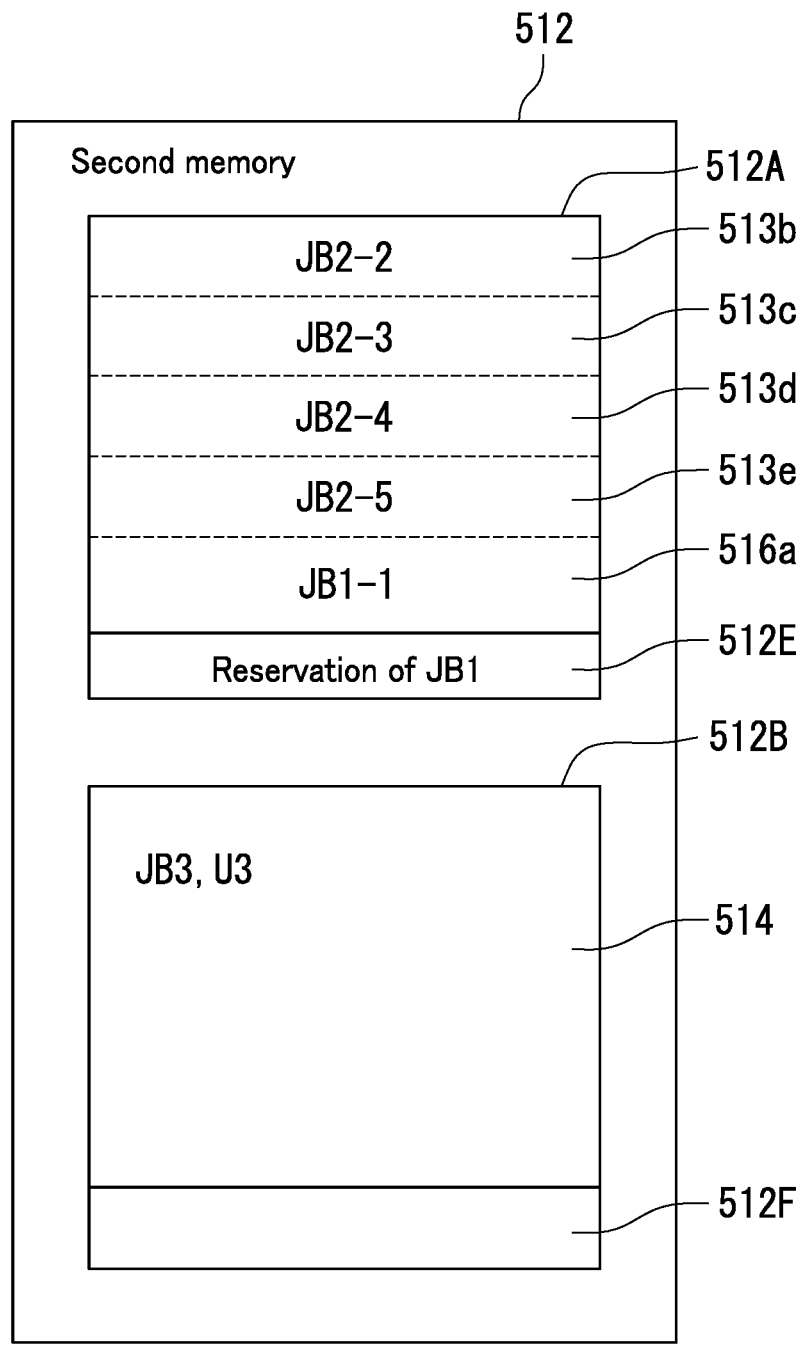
FIG. 6 is a diagram illustrating an example of the second memory in which the first page of a subsequent job of the same user is loaded.

The following describes a process performed by the execution section 505 and the third determination section 506 with reference to FIGS. 1 to 9. FIG. 6 is a diagram illustrating an example of the second memory 512 into which the first page included in the subsequent first job JB1 of the same first user U1 is loaded. As illustrated in FIG. 6, the first guaranteed area 512A further includes a sixth area 516a. The first job JB1 includes a first page image JB1-1. Processing on the first page image JB2-1 of the second job JB2 has been completed, and the first page image JB2-1 has been deleted from the first guaranteed area 512A of the second memory 512.

Accordingly, the third determination section 506 determines that the free space 512E has reached an amount equal to or greater than an amount of an area necessary for loading of a one-page image included in the first job JB1. The execution section 505 then loads the one-page image into the free space 512E. That is, the execution section 505 loads the first page image JB1-1 into the sixth area 516a as illustrated in FIG. 6.

Figure 7:
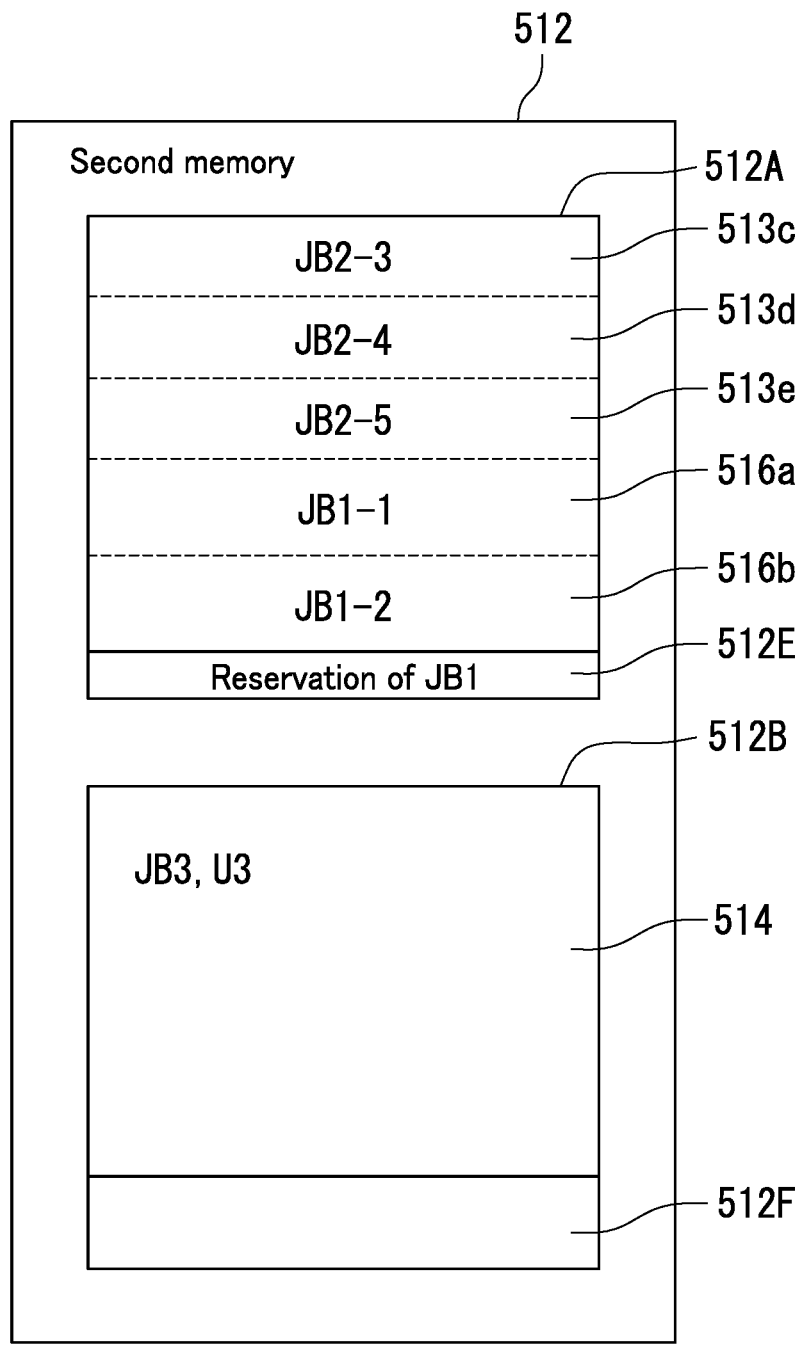
FIG. 7 is a diagram illustrating an example of the second memory in which the second page of the subsequent job of the same user is loaded.

The following further describes a process performed by the execution section 505 and the third determination section 506 with reference to FIG. 7. FIG. 7 is a diagram illustrating an example of the second memory 512 into which the second page included in the subsequent first job JB1 of the same first user U1 is loaded. As illustrated in FIG. 7, the first guaranteed area 512A further includes a seventh area 516b. The first job JB1 further includes a second page image JB1-2. Processing on the second page image JB2-2 of the second job JB2 has been completed, and the second page image JB2-2 has been deleted from the second memory 512.

The third determination section 506 accordingly determines that the free space 512E has reached an amount equal to or greater than an amount of an area necessary for loading of the one-page image included in the first job JB1. The execution section 505 then loads the one-page image into the free space 512E. That is, the execution section 505 loads the second page image JB1-2 into the seventh area 516b as illustrated in FIG. 7.

Figure 8:
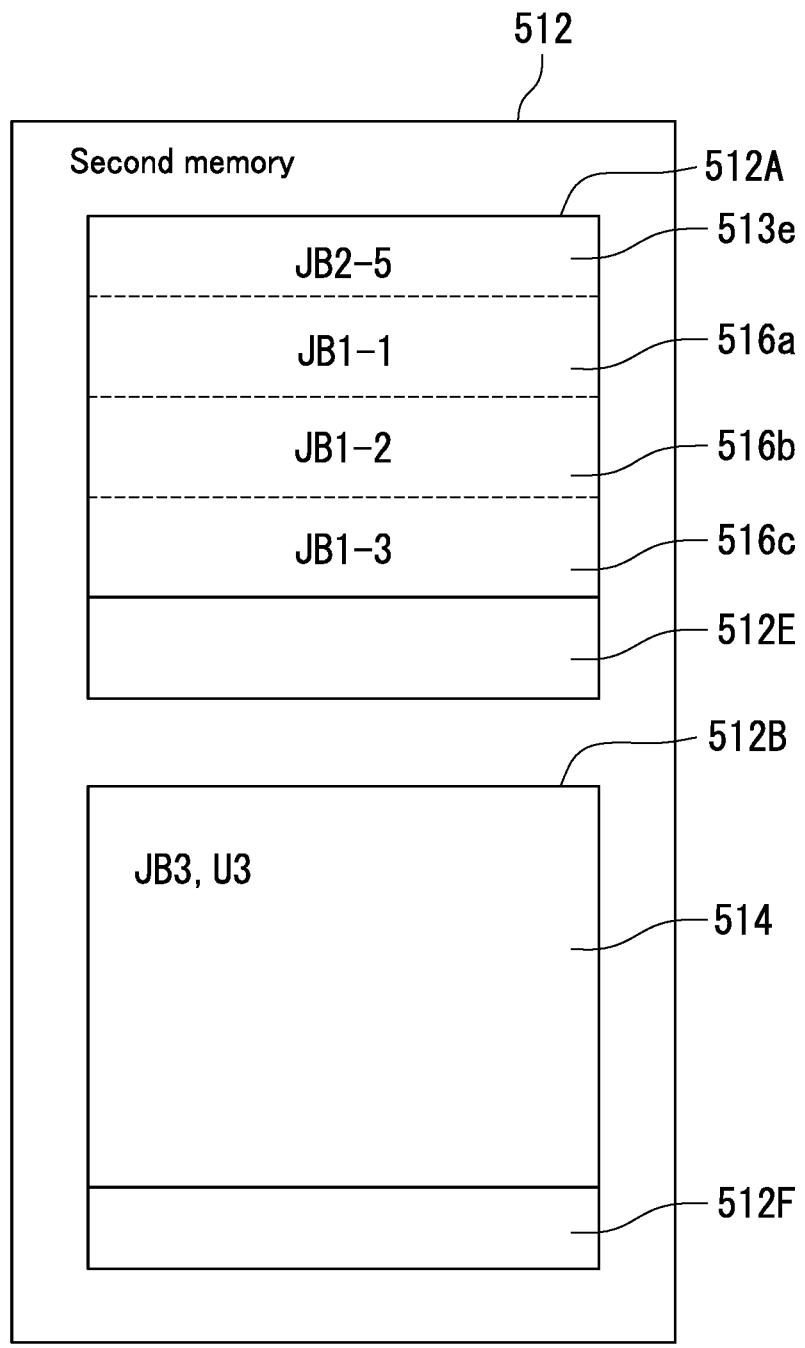
FIG. 8 is a diagram illustrating an example of the second memory in which all pages of the subsequent job of the same user are loaded.

The following further describes a process performed by the execution section 505 and the third determination section 506 with reference to FIG. 8. FIG. 8 is a diagram illustrating an example of the second memory 512 into which all pages included in the subsequent first job JB1 of the same first user U1 are loaded. As illustrated in FIG. 8, the first guaranteed area 512A further includes an eighth area 516c. The first job JB1 further includes a third page image JB1-3. Processing on the third page image JB2-3 of the second job JB2 has been completed, and the third page image JB2-3 has been deleted from the second memory 512. Furthermore, processing on the fourth page image JB2-4 of the second job JB2 has been completed, and the fourth page image JB2-4 has been deleted from the second memory 512.

The third determination section 506 accordingly determines that the free space 512E has reached an amount equal to or greater than an amount of an area necessary for loading of the one-page image included in the first job JB1. The execution section 505 then loads the one-page image into the free space 512E. That is, the execution section 505 loads the third page image JB1-3 into the eighth area 516c as illustrated in FIG. 8. The first job JB1 includes three page images in the present embodiment. In the above situation, all the images included in the first job JB1 are loaded in FIG. 8.

Figure 9:
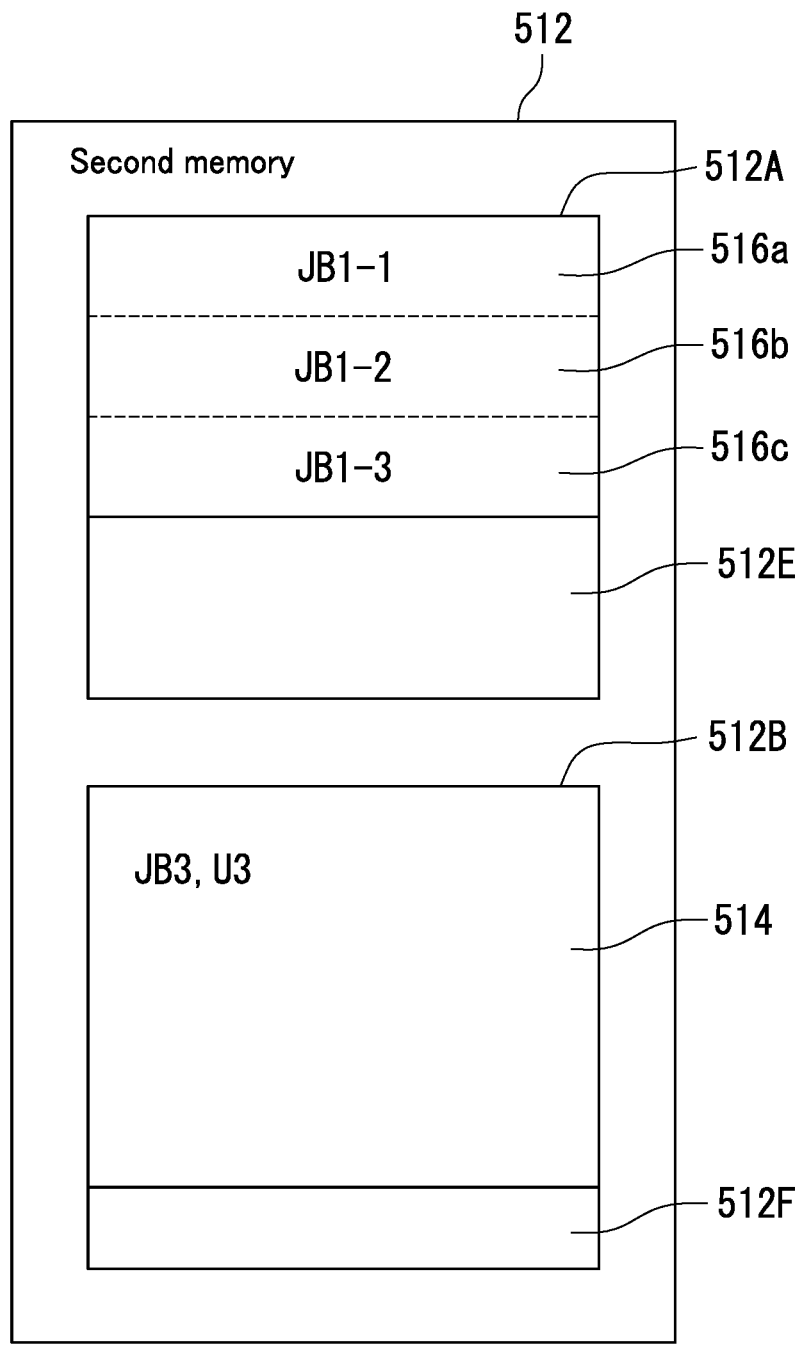
FIG. 9 is a diagram illustrating an example of the second memory when the subsequent job of the same user is executed.

The following further describes a process performed by the execution section 505 and the third determination section 506 with reference to FIG. 9. FIG. 9 is a diagram illustrating an example of the second memory when the subsequent first job JB1 of the same first user U1 is executed. As illustrated in FIG. 9, processing on the fifth page image JB2-5 of the second job JB2 has been completed and the fifth page image JB2-5 has been deleted from the second memory 512.

In the above situation, only the first job JB1 is loaded into the first guaranteed area 512A. Specifically, the first page image JB1-1 is loaded into the sixth area 516a, the second page image JB1-2 is loaded into the seventh area 516b, and the third page image JB1-3 is loaded into the eighth area 516c.

The execution section 505 then performs processing sequentially on the first page image JB1-1, the second page image JB1-2, and the third page image JB1-3.

According to the present embodiment as has been described with reference with FIGS. 1 to 9, once the free space 512E of the first guaranteed area 512A reaches an amount equal to or greater than an amount of an area necessary for loading of a one-page image included in the first job JB1, the one-page image included in the first job JB1 is loaded into the free space 512E of the first guaranteed area 512A. As a result of the one-page image included in the first job JB1 being loaded into the first guaranteed area 512A, the one-page image included in the first job JB1 can be loaded in advance of processing to load the first job JB1 into the first guaranteed area 512A. Thus, throughput can be increased.

Figure 10:
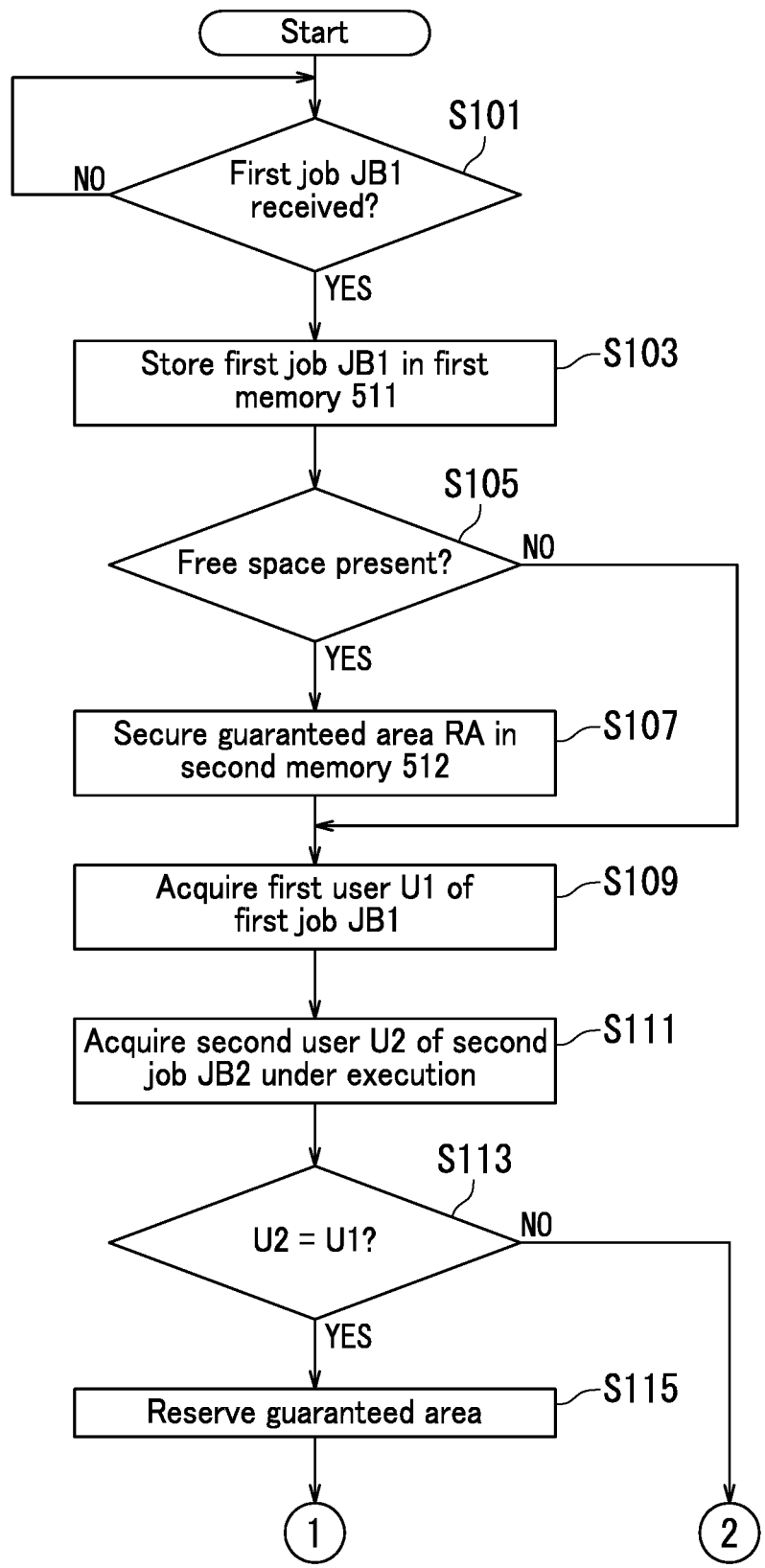
FIG. 10 is a flowchart depicting a process performed by the controller.
Figure 11:
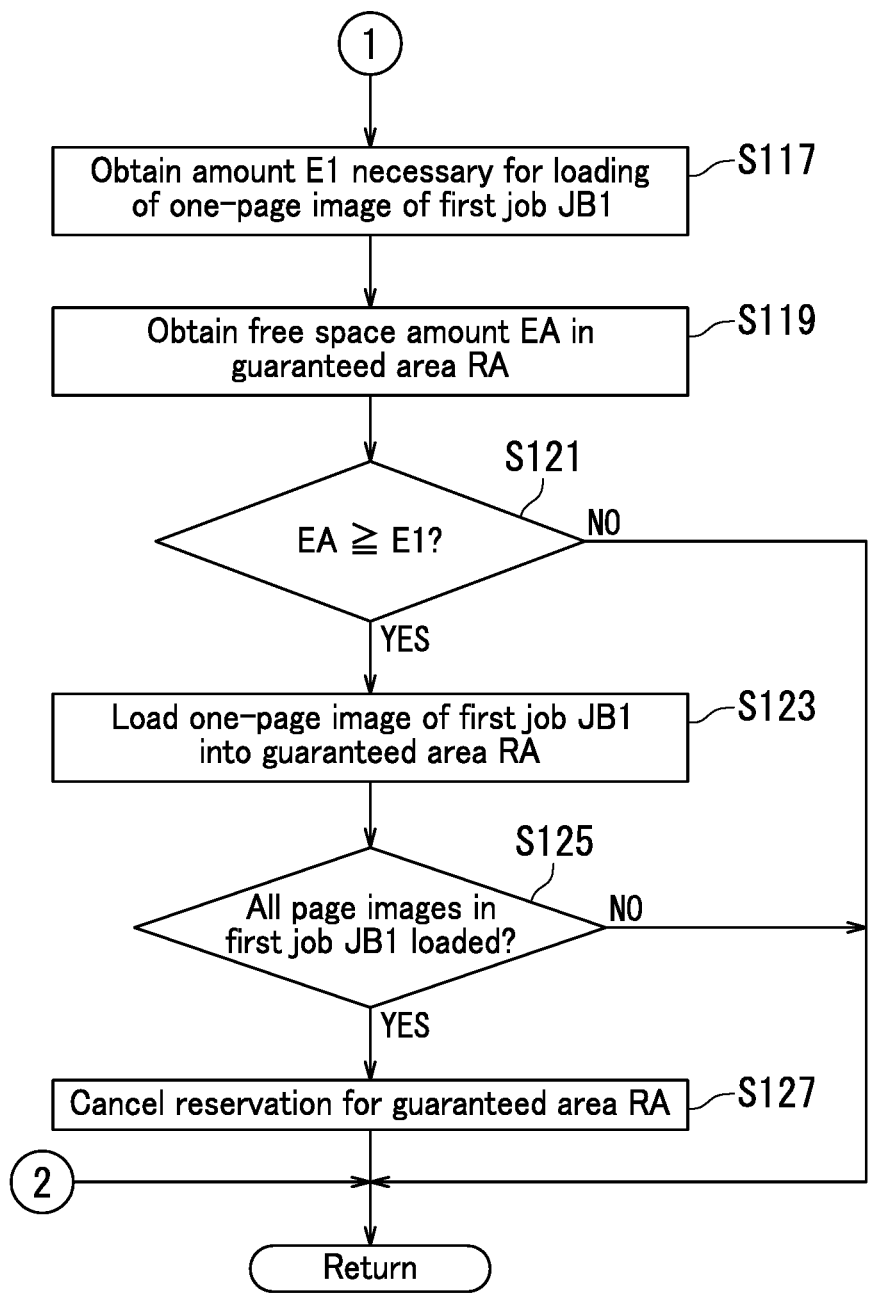
FIG. 11 is a flowchart depicting a process performed by the controller.

The following describes a process performed by the controller 5 with reference to FIGS. 1 to 11. FIGS. 10 and 11 are flowcharts depicting the process performed by the controller 5. Note that a case will be described in the present embodiment where the second job JB2 is under execution and an image included in the second job JB2 is loaded into the first guaranteed area 512A.

First, it is determined whether or not the receiving section 501 has received the first job JB1 in Step S101 in FIG. 10.

When it is determined that the receiving section 501 has not received the first job JB1 (NO in step S101), the processing enters a standby state. When it is determined that the receiving section 501 has received the first job JB1 (YES in Step S101), the processing proceeds to Step S103.

In Step S103, the controller 5 stores the first job JB1 in the first memory 511.

Next, in Step S105, the first determination section 502 determines whether or not there is the specific amount of free space in the second memory 512. Specifically, the first determination section 502 determines whether or not the second guaranteed area 512B is free.

When the first determination section 502 determines that there is not the specific amount of free space in the second memory 512 (NO in Step S105), the processing proceeds to Step S109. When the first determination section 502 determines that there is the specific amount of free space in the second memory 512 (YES in Step S105), the processing proceeds to Step S107.

In Step S107, the securing section 503 secures the second guaranteed area 512B in the specific amount necessary for execution of the first job JB1 in the second memory 512.

Next in Step S109, the second determination section 504 acquires the first user U1 who has input the first job JB1.

Next in Step S111, the second determination section 504 acquires the second user U2 who has input the second job JB2 that is under execution.

Subsequently, the second determination section 504 determines whether or not the first user U1 matches the second user U2 in Step S113.

When the second determination section 504 determines that the first user U1 does not match the second user U2 (NO in Step S113), the processing returns to Step S101. When the second determination section 504 determines that the first user U1 matches the second user U2 (YES in Step S113), the processing proceeds to Step S115.

In Step S115, the execution section 505 reserves the guaranteed area RA. Specifically, the guaranteed area RA is a guaranteed area (first guaranteed area 512A) into which the second job JB2 under execution is being loaded. The phrase "reserves the guaranteed area RA" means that the execution section 505 loads an image included in the first job JB1 into the guaranteed area RA along with execution of the second job JB2, and executes the first job JB1 subsequent to the second job JB2.

Next in Step S117, the execution section 505 obtains an amount E1 necessary for loading of a one-page image of the first job JB1 as depicted in FIG. 11.

In Step S119, the execution section 505 then obtains a free space amount EA in the guaranteed area RA.

In Step S121, the execution section 505 determines whether or not the free space amount EA is equal to or greater than the amount E1.

When the execution section 505 determines that the free space amount EA is not equal to or greater than the amount E1 (NO in Step S121), the processing returns to Step S101 in FIG. 10. When the execution section 505 determines that the free space amount EA is equal to or greater than the amount E1 (YES in Step S121), the processing proceeds to Step S123.

In Step S123, the execution section 505 loads the one-page image of the first job JB1 into the guaranteed area RA.

In Step S125, the securing section 503 determines whether or not all page images included in the first job JB1 have been loaded.

When it is determined that not all the page images included in the first job JB1 have been loaded (NO in Step S125), the processing returns to Step S101 in FIG. 10. When it is determined that all of the page images included in the first job JB1 have been loaded (YES in Step S125), the processing proceeds to Step S127.

In Step S127, the securing section 503 then cancels reservation for the guaranteed area RA. The processing then returns to Step S101 in FIG. 10. The phrase "cancels reservation for the guaranteed area RA" means that the execution section 505 does not load the first job JB1 into the guaranteed area RA. Specifically, the phrase "cancels reservation for the guaranteed area RA" means that the execution section 505 has loaded all of the page images included in the first job JB1 into the guaranteed area RA.

According to the present embodiment as described with reference to FIGS. 1 to 11, the securing section 503 secures the second guaranteed area 512B necessary for execution of the first job JB1 in the second memory 512. The execution section 505 then loads the images included in the first job JB1 into the second guaranteed area 512B. Thus, the first job JB1 can be executed subsequent to the second job JB2.

An embodiment of the present invention has been described so far with reference to the drawings. However, the present invention is not limited to the above-described embodiment and can be practiced in various ways within the scope without departing from the essence of the present invention (for example, as described below in sections (1) to (4)). The drawings schematically illustrate elements of configuration in order to facilitate understanding and properties of elements of configuration illustrated in the drawings, such as thickness, length, and number thereof, may differ from actual properties thereof in order to facilitate preparation of the drawings. The shape, the dimension, and so on of each element of configuration shown in the above-described embodiment are exemplary only and not particularly limited. Various alterations can be made within the scope not substantially departing from the configuration of the present invention.

(1) As described with reference to FIG. 1, the image forming apparatus 100 is a multifunction peripheral in the present embodiment, which should not be taken to limit the present invention. The image forming apparatus 100 needs only to include the image forming section 13. For example, the image forming apparatus 100 may be a copier.

(2) As described with reference to FIG. 1, the image processing device is included in the image forming apparatus 100 in the present embodiment, which should not be taken to limit the present invention. The image processing device needs only to be included in an electronic device that receives a plurality of jobs. The electronic device may be for example a photographic processing device that forms a photographic image on a printing paper.

(3) As described with reference to FIG. 2, the controller 5 receives the jobs JB from the personal computers 200 in the present embodiment, which should not be taken to limit the present invention. The controller 5 may receive the jobs JB from terminal devices operated by users. The terminal devices may for example be smartphones.

(4) As described with reference to FIG. 4, the second memory 512 has two guaranteed areas (the first guaranteed area 512A and the second guaranteed area 512B) in the present embodiment, which should not be taken to limit the present invention. The second memory needs only to have at least one guaranteed area. The second memory 512 may have one guaranteed area or three or more guaranteed areas.

INDUSTRIAL APPLICABILITY

The present invention relates to an image processing device and an image forming apparatus, and therefore, has industrial applicability.

The invention claimed is:

1. An image forming apparatus comprising:
an image forming section configured to form an image on a recording medium;
a processor configured to sequentially receive jobs, each of the jobs being a job to form the image on the recording medium using the image forming section;
first memory configured to sequentially stores the jobs sequentially received by the processor; and
second memory that has a plurality of guaranteed areas in which images included in the respective jobs are to be loaded on a page-by-page basis, wherein
the processor
causes, when receiving the job among the jobs, the first memory to store the received job, determines whether or not there is a specific amount of free space in the second memory necessary for execution of the received job,
secures one of the guaranteed areas when determining that there is the specific amount of the free space in the second memory,
loads an image included in the received job into the secured guaranteed area on the page-by-page basis,
controls the image forming section so that the image forming section forms the image included in the received job on the recording medium on the page-by-page basis through execution of the received job, and
deletes, each time a one-page image of the received job is formed on the recording medium, the one-page image from the second memory, and
the processor
determines, when receiving a first job among the jobs, whether or not a user who has input the first job is the same user as a user who has input a second job, the second job being under execution using one of the guaranteed areas,
reserves, when determining that the user who has input the first job is the same user as the user who has input the second job, a guaranteed area among the guaranteed areas into which an image included in the second job is being loaded as an area into which an image included in the first job is to be loaded,
loads the image included in the first job into the reserved guaranteed area on the page-by-page basis, and
executes the first job subsequent to the second job.

2. The image forming apparatus according to claim 1, wherein
the processor determines whether or not an amount of free space of the guaranteed area into which the second job has been loaded has reached an amount equal to or greater than an amount of an area necessary for loading of one-page image included in the first job, and
the processor loads the one-page image included in the first job into the free space of the guaranteed area into which the second job has been loaded according to determination that the amount of the free space of the guaranteed area into which the second job has been loaded has reached the amount equal to or greater than the amount of the area necessary for leading of the one-page image included in the first job.

3. The image forming apparatus according claim 1, wherein when receiving a third job among the jobs, the processor determines whether or not a user who has input the third job is the same user as the user who has input the first job,
when determining that the user is the same user as the first user, the processor reserves a guaranteed area among the guaranteed areas as an area into which an image included in the third job is to be loaded, the reserved guaranteed area being the area into which the image included in the first job has been loaded, and
the processor loads the image included in the third job into the reserved guaranteed area on the page-by-page basis, and executes the third job subsequent to the first job.

4. The image forming apparatus according to claim 1, wherein
the processor receives the jobs from a plurality of terminal devices,
according to whether or not a first terminal device matches a second terminal device, the processor determines whether or not the user who has input the first job is the same user as the user who has input the second job, the processor receiving the first job and the second job, the first job being received by the first terminal device, the second job being received by the second terminal device, the first terminal device is one of the plurality of terminal devices, and the second terminal device is one of the plurality of terminal devices.

5. The image forming apparatus according to claim 1, wherein the guaranteed areas include a first guaranteed area and a second guaranteed area different from the first guaranteed area, the first guaranteed area stores no job therein, the second guaranteed area stores no job therein, and when receiving the second job, the processor loads the image included in the second job into the first guaranteed area and deletes the second job from the first memory.

6. The image forming apparatus according to claim 5, wherein when receiving a third job among the jobs subsequent to the second job, the processor loads an image included in the third job into the second guaranteed area and deletes the third job from the first memory, and the third job differs from the second job.

7. The image forming apparatus according to claim 6, wherein when receiving a fourth job among the jobs subsequent to the third job, the processor neither secures the first guaranteed area nor the second guaranteed area, and the fourth job differs from the second job and the third job.

\* \* \* \* \*